(12) United States Patent
Tegeler et al.

(10) Patent No.: US 8,327,614 B1
(45) Date of Patent: Dec. 11, 2012

(54) REPAIR ROLLER

(75) Inventors: Roger Allen Tegeler, Morrison, IL (US); Vernon Eugene Skipper, Cordova, IL (US); Thomas Christopher Paul, Clinton, IA (US)

(73) Assignee: The Timken Company, Canton, OH (US)

( * ) Notice: Subject to any disclaimer, the term of this patent is extended or adjusted under 35 U.S.C. 154(b) by 0 days.

(21) Appl. No.: 13/345,445

(22) Filed: Jan. 6, 2012

(51) Int. Cl.
*F16H 55/12* (2006.01)
*B65G 17/06* (2006.01)

(52) U.S. Cl. .................... 59/4; 59/7; 198/842; 198/845; 193/37; 474/95

(58) Field of Classification Search .................... 59/4, 7, 59/9; 198/842, 845; 193/37; 474/95
See application file for complete search history.

(56) References Cited

U.S. PATENT DOCUMENTS

| | | | | |
|---|---|---|---|---|
| 569,663 A * | 10/1896 | Perkins | ......................... | 474/95 |
| 1,758,280 A * | 5/1930 | Evans | .............................. | 193/37 |
| 1,829,973 A * | 11/1931 | Wilkinson | ..................... | 193/37 |
| 4,402,390 A * | 9/1983 | Feeney | ............................. | 193/37 |
| 5,117,970 A * | 6/1992 | Gibbs | .......................... | 198/842 |
| 5,378,203 A * | 1/1995 | Baebel | ......................... | 198/842 |
| 6,527,106 B2 * | 3/2003 | Tanabe et al. | ................. | 198/845 |

* cited by examiner

*Primary Examiner* — David B Jones
(74) *Attorney, Agent, or Firm* — Vedder Price PC

(57) ABSTRACT

A repair roller may include a cylinder with components that may have an outer surface, an inner surface and end surfaces. Each of the end surfaces may include a mating portion and outer portions that extend from the ends of the mating portion. A pair of complementary interlocking elements may be disposed within the mating portion for secure engagement of the components.

13 Claims, 4 Drawing Sheets

REPAIR ROLLER

FIELD OF THE DISCLOSURE

The present disclosure is related to a roller, a method of repairing a roller chain and a chain including a roller, and more particularly, to a multi-component repair roller, a method of repairing a roller chain with a repair roller and a chain including a repair roller.

BACKGROUND

Roller chain is a type of chain drive designed for the transfer of mechanical power in many kinds of domestic, industrial and agricultural machinery, including conveyors, wire and tube drawing machines, printing presses, cars, motorcycles, and simple machines like bicycles. Commonly, a roller chain has a series of links designed to mesh with the teeth of the sprockets of the machine, and are flexible in only one dimension. Each link may include short cylindrical rollers held together by side links by an axle that is connected to the side links and passes through the rollers. The chain is commonly driven by a toothed wheel called a sprocket. It is a simple, reliable, and efficient means of power transmission. Generally, there are two types of links alternating in the roller chain. The first type is inner links, having two inner plates held together by two axles upon which two rollers may rotate. Inner links alternate with the second type, the outer links, consisting of two outer plates held together by pins passing through the bushings of the inner links. Roller chain with plastic rollers has been used in the food, beverage, pharmaceutical, packaging, power transmission and related product processing industries. However, it is common knowledge that the rollers wear out faster than the plates or side bars. As a result, a chain that would have considerable life remaining must be discarded because some of the rollers are out of specification. This of course is an expensive and time consuming process. Conventional solutions require disassembly of the chain to even attempt a repair that may irreparably damage the chain. Moreover, conventional plastic rollers are either machined or molded in one piece that is permanently assembled into the roller chain. Since the roller is permanently assembled into the chain, a worn roller cannot be removed and replaced without destroying the interference fit between the side bars and the axle (for carrier and top rollers) or destroying the integrity of a retainer (for outboard rollers).

Therefore, there is a need in the art for a repair roller that overcomes the aforementioned disadvantages and provides extended life for the chain and lower costs.

BRIEF DESCRIPTION OF THE DRAWINGS

The following disclosure as a whole may be best understood by reference to the provided detailed description when read in conjunction with the accompanying drawings, drawing description, abstract, background, field of the disclosure, and associated headings. Identical reference numerals when found on different figures identify the same elements or a functionally equivalent element. The elements listed in the abstract are not referenced but nevertheless refer by association to the elements of the detailed description and associated disclosure.

DETAILED DESCRIPTION

Figure 1:
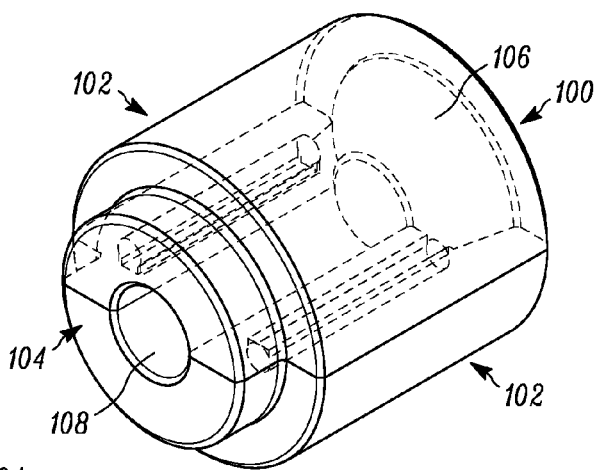
FIG. 1 is a perspective view of a repair roller in accordance with one embodiment of the present disclosure.
Figure 2:
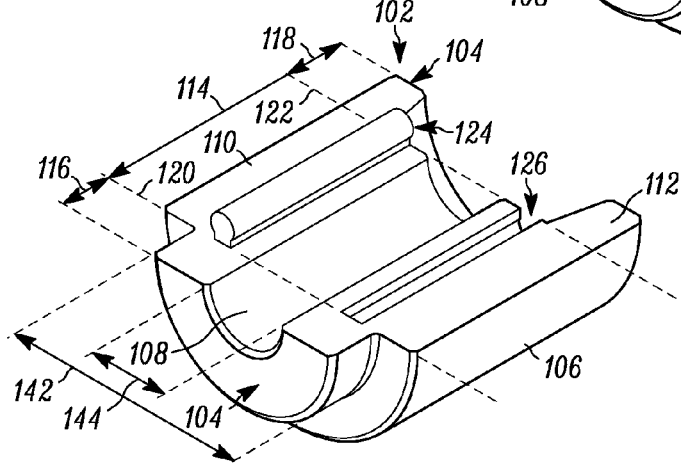
FIG. 2 is a top perspective view of a component of the repair roller of FIG. 1.
Figure 3:
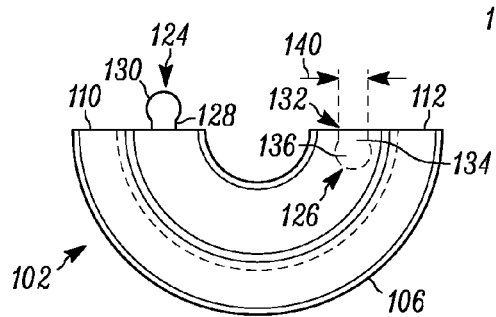
FIG. 3 is an end view of the component of FIG. 2.
Figure 4:
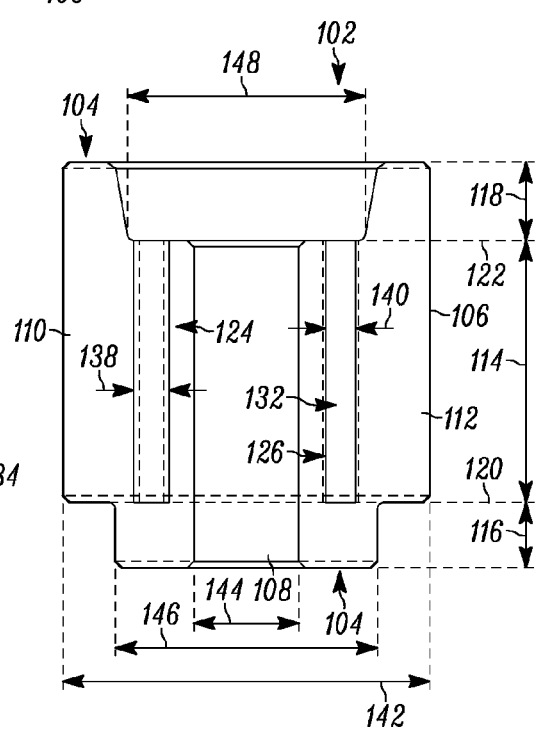
FIG. 4 is a top view of the component of FIG. 2.

The present disclosure is not limited to the particular details of the apparatus depicted, and other modifications and applications may be contemplated. Further changes may be made in the apparatus, device or methods without departing from the true spirit of the scope of the disclosure herein involved. It is intended, therefore, that the subject matter in this disclosure should be interpreted as illustrative, not in a limiting sense.

In one aspect of the present disclosure, a repair roller may include components that define a cylinder that each may include a wall with an outer surface, an inner surface and first and second end surfaces. Each of the first and second end surfaces may include a mating portion and outer portions that extend from the ends of the mating portion. A pair of complementary interlocking elements may be disposed within the mating portion.

In another aspect of the present disclosure, the repair roller may include a projection and a groove as the complementary interlocking elements having a complementary configuration for secure engagement. Additionally, the projection and groove may each extend between the opposing ends of the respective mating portion. Moreover, the projection may include a stem and an enlarged end, and the groove may include an opening, a passage and an enlarged cavity extending from the passage. Furthermore, the enlarged end may have a width that is greater than a width of the opening and passage.

In a further aspect of the present disclosure, the mating portion outer surface may define a central outer diameter and the mating portion inner surface may define a central inner diameter. In one embodiment, one of the outer portions may include an outer diameter that is less than the central outer diameter and an inner diameter that is equivalent to the central inner diameter. In another embodiment, one of the outer portions may include an outer diameter that is equivalent to the central outer diameter and an inner diameter that is greater than the central inner diameter.

In a still further aspect of the present disclosure, a roller chain may include links that may include a pair of side bars and a pair of rollers, where one of the rollers may be a repair roller in accordance with one of the embodiments described herein.

In yet another aspect of the present disclosure, a method of repairing a roller chain that may include links that may include a pair of side bars and a pair of rollers, may include removing one of the rollers when the link is in situ in the roller chain, and installing a repair roller in accordance with one of the embodiments described herein.

In still yet another aspect of the present disclosure, a method of repairing a roller chain that may include links that may include a pair of side bars and a pair of rollers mounted to the side bars by an axle, where one axle has an elongated configuration and a pin on which an outboard carrier roller is disposed and rotatably secured in position by a retainer fixed to the pin, may include removing the outboard carrier roller from the pin when the pin is in situ on the axle and the retainer is in situ on the pin, and installing a repair roller in accordance with one of the embodiments described herein.

FIGS. 1-4 illustrate a perspective view of a repair roller 100 and various views of a symmetrical component 102 of the repair roller 100, in accordance with one embodiment of the present disclosure. The repair roller 100 may include a plurality of symmetrical components 102 that cooperatively define any suitable configuration, such as, for example only, what may be commonly referred to as a cylinder or a configuration at least roughly approximating a cylindrical shape, etc. In one embodiment, each component 102 may include a wall 104, that generally represents or would be recognized as a "wall" of a cylinder, having an outer bearing surface 106, an inner mounting surface 108, a first end surface 110 and a second end surface 112. The outer bearing surface 106 and the inner mounting surface 108 are offset from one another to define a "thickness" of the wall 104. Each of the first and second end surfaces 110, 112 may include a centrally disposed mating portion 114 and opposed outer portions 116, 118 that extend from respective ends 120, 122 of the mating portion 114.

In one embodiment, a pair of complementary interlocking elements may include a projection 124 and a groove 126, where one of the pair of complementary interlocking elements is preferably disposed within each respective mating portion 114 and more preferably disposed solely with each respective mating portion 114 such that the projection 124 and the groove 126 each extend between the opposing ends 120, 122 of the respective mating portion 114. The projection 124 may be disposed on and extending from one of the first and second end surface 110, 112 mating portions 114 and the groove may be formed in an other of the first and second end surface 110, 112 mating portions 114. Preferably, the projection 124 and the groove 126 have a complementary configuration for secure engagement and more preferable in a snap-fit manner. The projection 124 may include a stem 128 disposed between the one of the first and second end surface 110, 112 mating portions 114 and an enlarged end 130 and the groove 126 may include an opening 132 defined in the other of the first and second end surface 110, 112 mating portions 114, a passage 134 extending from the opening 132 and an enlarged cavity 136 extending from the passage 134. It is within the teachings of the present disclosure that the complementary interlocking elements may have any suitable or desirable configuration satisfactory to provide the intended functionality as described herein. Preferably, the enlarged end 130 of the projection 124 has a width dimension 138 that is greater than a width dimension 140 of the opening 132 and passage 134. One of ordinary skill in the art will recognize that any other suitable configurations for providing a removably secure, such as a snap-fit, connection are within the scope of this disclosure and may be freely substituted for the embodiment described herein.

In one embodiment, the mating portion 114 outer bearing surface 106 defines a central outer diameter 142 and the mating portion 114 inner mounting surface 108 defines a central inner diameter 144. One of the outer portions 116, 118 may include a first end outer diameter 146 that is less than the central outer diameter 142 and a first end inner diameter 144 that is equivalent to the central inner diameter 144 and an other of the outer portions 116, 118 may include a second end outer diameter 142 that is equivalent to the central outer diameter 142 and a second end inner diameter 148 that is greater than the central inner diameter 144.

Figure 5:
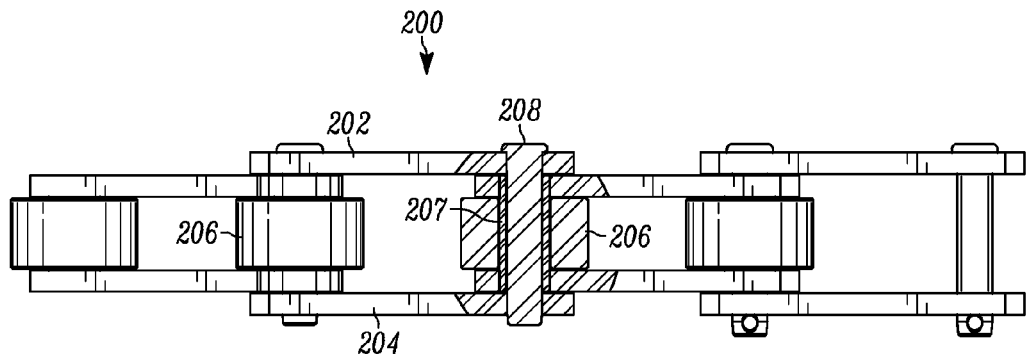
FIG. 5 is a top view of one embodiment of a conventional roller chain.
Figure 6:
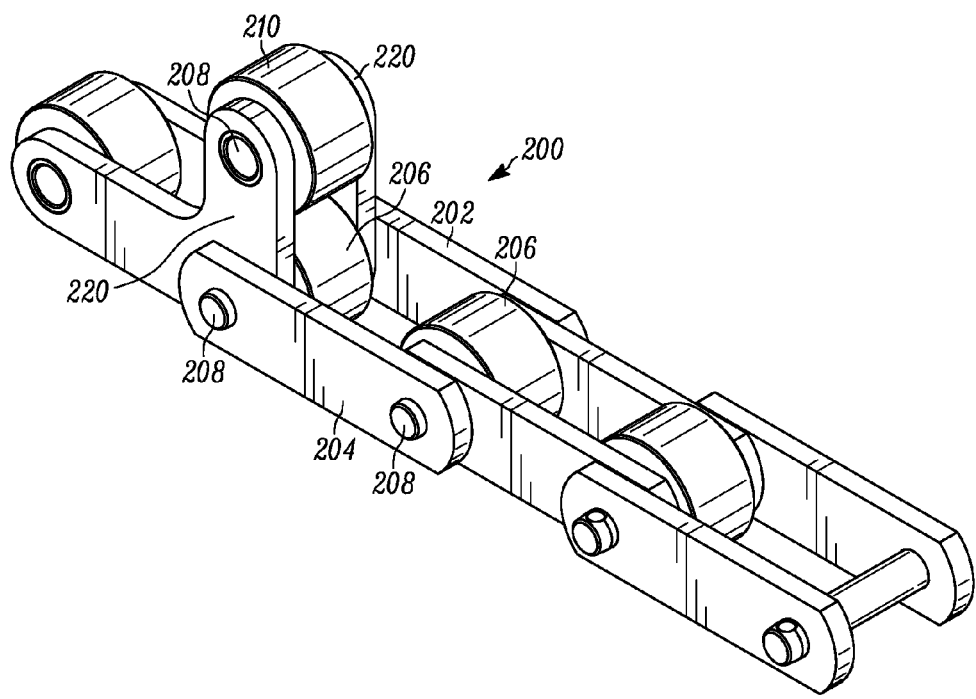
FIG. 6 is a perspective view of another embodiment of a conventional roller chain.

FIGS. 5 and 6 illustrate embodiments of a conventional roller chain 200. In FIG. 5, the roller chain 200 may include a plurality of links 201, where each link 201 may include a pair of side bars 202, 204 and a pair of rollers 206 mounted to the side bars 202, 204 by a bushing 207 and an axle 208. The rollers 206 in this embodiment are commonly referred to as carrier rollers. In FIG. 6, the roller chain 200 is substantially similar to the embodiment described with respect to FIG. 5, except that the side bars 202, 204 of one link 201 include an additional element 220 that extends laterally from the longitudinal axis of the roller chain 200 in order to likewise mount an additional roller, commonly referred to as a top roller 210. It is within the teachings of the present disclosure that the various elements of the roller chain 200 and the materials of construction may be configured as desired in order to provide any suitable functionality. For example, the elements may be made from metal, plastic or any other suitable natural or synthetic material, etc.

Figure 7:
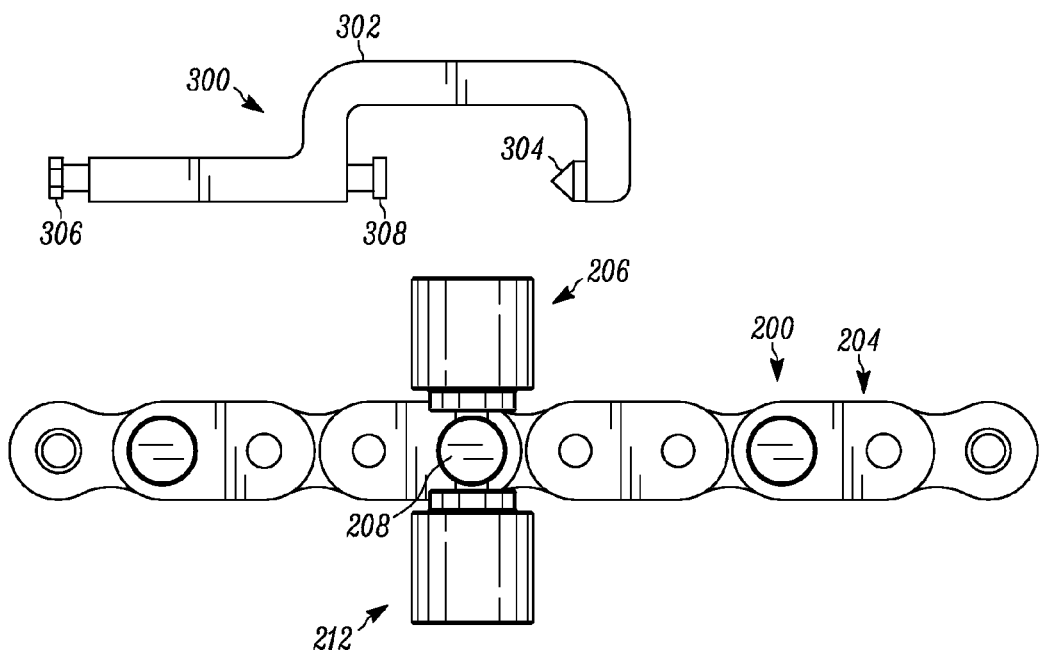
FIG. 7 is a side view of a roller chain to be repaired in accordance with one embodiment of the present disclosure.
Figure 8:
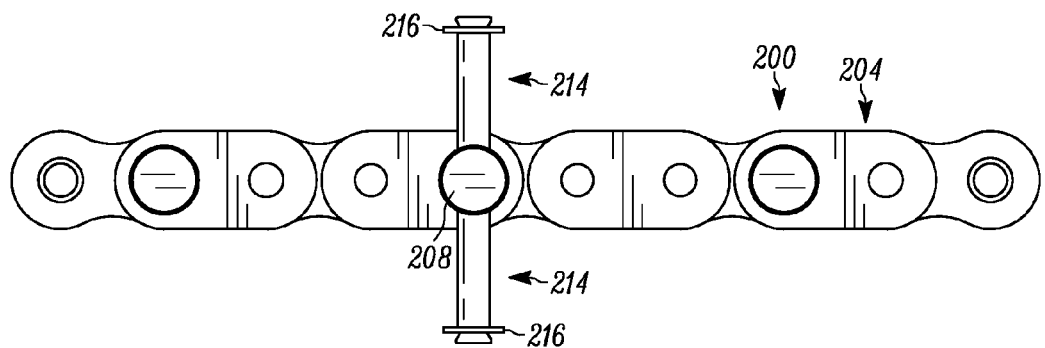
FIG. 8 is a side view of the chain of FIG. 7 after outboard rollers have been removed.

FIGS. 7-10 illustrate some of the steps for one embodiment of a method of repairing a roller chain 200 in accordance with one embodiment of the present disclosure. In FIG. 7, the roller chain 200 is substantially similar to the roller chain embodiments described herein with respect to FIGS. 5 and 6, except that an axle 208 may have an elongated configuration (as best viewed in FIGS. 9 and 10) and a pin 214 that extends normal to the axle 208 and may include a retainer 216 fixed to the pin 214. A roller, commonly referred to as an outboard roller 212, is disposed on the pin 214 and rotatably secured in such position by the retainer 216 with a substantially interference fit, weld, deformed pin end (e.g. spun or stacked head) or other suitable process or method. In this embodiment, a pair of outboard rollers 212 are provided diametrically opposite from one another. It is within the teachings of the present disclosure that any suitable or desirable configuration of rollers 206, 210, 212 may be provided in order to satisfy the intended functionality. A tool 300 may be used to remove the outboard roller 212 from the pin 214 when the pin 214 is in situ on the axle 208 and the retainer 216 is in situ on the pin 214. One of ordinary skill in the art will recognize that the retainer 216 is commonly permanently secured to the pin 214, such as by welding or other suitable process, etc. which is one reason why previous attempts to repair roller chain have failed. The tool 300 may have any suitable configuration, such as, for example, a frame 302 having a splitting element 304 disposed at one distal end, an adjustment mechanism 306 disposed at an opposite distal end and an adjuster 308 disposed in a medial location. Preferably, the roller 212 is disposed between the splitting element 304 and the adjuster 308 such that when the adjustment mechanism 306 is actuated the adjuster 308 forces the splitting element 304 into the roller 206 so that the roller 212 is fractured or split into at least 2 pieces for easy removal from the pin 214. FIG. 8 illustrates the roller chain 200 after the removal step.

Figure 9:
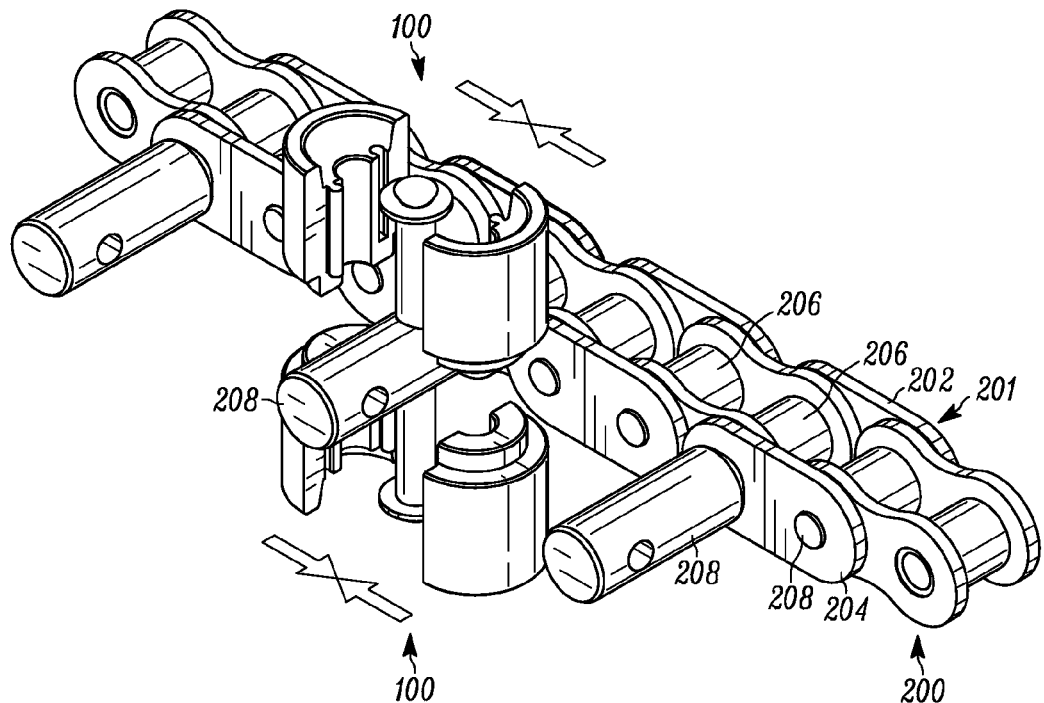
FIG. 9 is a perspective view of a repair roller installation on the chain of FIG. 8.
Figure 10:
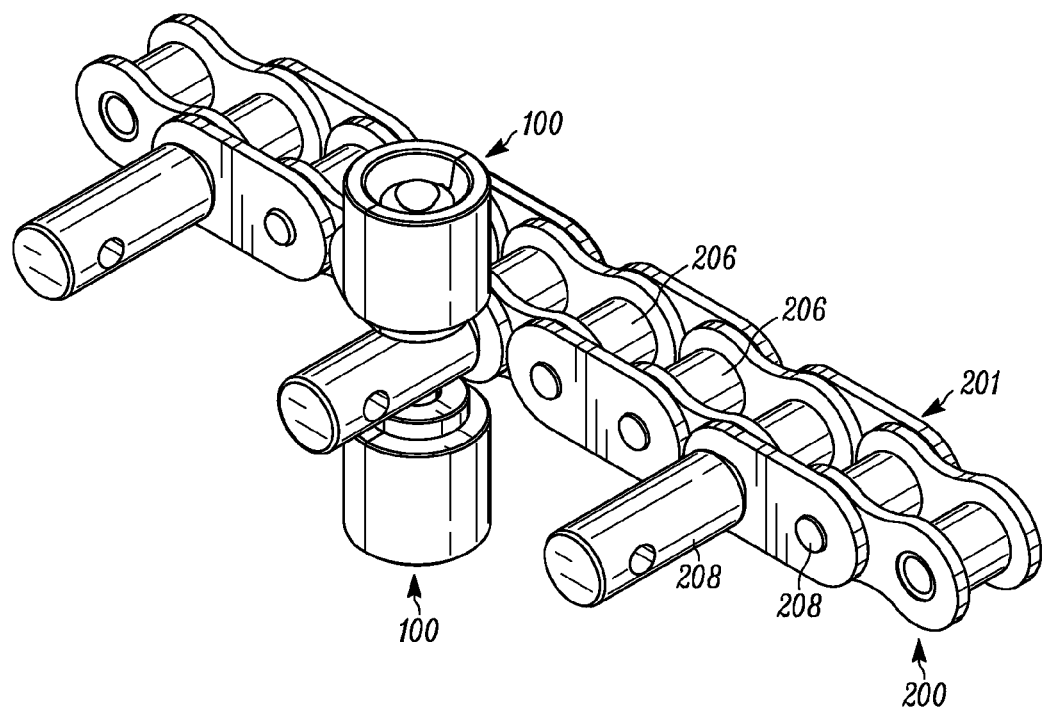
FIG. 10 is a perspective view of an installed repair roller on the chain of FIG. 9.

In FIG. 9, two symmetrical components 102 of a repair roller 100, configured in accordance with one embodiment of the present disclosure, are disposed about the pin 214 so that the repair roller 100 may be installed, preferably in a snap-fit manner, on the pin 214. FIG. 10 illustrates the repair roller 100, configured in accordance with one embodiment of the present disclosure, installed on the pin 214.

It is within the teachings of the present disclosure that the method of repairing a roller chain 200 (such as shown in FIGS. 5 and 6) with a repair roller 100, as described herein, may be likewise applied with respect to carrier and top rollers 206, 210 as well. For example, such a method may include removing one of the rollers 206, 210 from the axle 208 (which may also include the bushing 207) with the tool 300 when the axle 208 and the link 201 are in situ in the roller chain 200 and installing a repair roller 100, configured in accordance with one embodiment of the present disclosure, on such axle 208.

The preceding detailed description merely sets forth some examples and embodiments of the present disclosure and that numerous changes to the disclosed embodiments can be made in accordance with the disclosure herein without departing from its spirit or scope. The preceding description, therefore, is not meant to limit the scope of the disclosure but to provide sufficient disclosure to one of ordinary skill in the art to practice the invention without undue burden.

What is claimed is:

1. A repair roller comprising: a plurality of symmetrical components configured to cooperatively define a cylinder, each component including a wall having an outer bearing surface, an inner mounting surface, a first end surface and a second end surface, each of the first and second end surfaces including a centrally disposed mating portion and opposed outer portions that extend from respective ends of the mating portion, and one of a pair of complementary interlocking elements disposed solely within the respective mating portion, wherein the pair of complementary interlocking elements includes a projection disposed on and extending from one of the first and second end surface mating portions and a groove formed in an other of the first and second end surface mating portions, wherein the projection and the groove have a complementary configuration for secure engagement, wherein the groove includes an opening defined in the other of the first and second end surface mating portions, a passage extending from the opening and an enlarged cavity extending from the passage.

2. The repair roller of claim 1, wherein the projection and the groove each extend between the opposing ends of the respective mating portion.

3. The repair roller of claim 1, wherein the projection includes a stem disposed between the one of the first and second end surface mating portions and an enlarged end.

4. The repair roller of claim 1, wherein the projection includes an enlarged end having a width dimension that is greater than a width dimension of the opening and passage.

5. The repair roller of claim 1, wherein the outer bearing surface disposed in alignment with the mating portion defines a central outer diameter and the inner mounting surface disposed in alignment with the mating portion defines a central inner diameter and further comprising one of the outer portions having a first end outer diameter that is less than the central outer diameter and a first end inner diameter that is equivalent to the central inner diameter.

6. The repair roller of claim 1, wherein the outer bearing surface disposed in alignment with the mating portion defines a central outer diameter and the inner mounting surface disposed in alignment with the mating portion defines a central inner diameter and further comprising an other of the outer portions having a second end outer diameter that is equivalent to the central outer diameter and a second end inner diameter that is greater than the central inner diameter.

7. A roller chain comprising: a plurality of links, each link including a pair of side bars and a pair of rollers, wherein one of the rollers is a repair roller including a plurality of symmetrical components configured to cooperatively define a cylinder, each component including a wall having an outer bearing surface, an inner mounting surface, a first end surface and a second end surface, each of the first and second end surfaces including a centrally disposed mating portion and opposed outer portions that extend from respective ends of the mating portion, and one of a pair of complementary interlocking elements disposed solely within the respective mating portion, wherein the pair of complementary interlocking elements includes a projection disposed on and extending from one of the first and second end surface mating portions and a groove formed in an other of the first and second end surface mating portions, wherein the projection and the groove have a complementary configuration for secure engagement, wherein the projection includes a stem disposed between the one of the first and second end surface mating portions and an enlarged end.

8. The roller chain of claim 7, wherein the projection and the groove each extend between the opposing ends of the respective mating portion.

9. The roller chain of claim 7, wherein the groove includes an opening defined in the other of the first and second end surface mating portions, a passage extending from the opening and an enlarged cavity extending from the passage.

10. The roller chain of claim 9, wherein the projection includes an enlarged end having a width dimension that is greater than a width dimension of the opening and passage.

11. The roller chain of claim 7, wherein the repair roller is disposed as one of the group consisting of a carrier roller and a top roller.

12. A repair roller comprising: a plurality of symmetrical components configured to cooperatively define a cylinder, each component including a wall having an outer bearing surface, an inner mounting surface, a first end surface and a second end surface, each of the first and second end surfaces including a centrally disposed mating portion and opposed outer portions that extend from respective ends of the mating portion, and one of a pair of complementary interlocking elements disposed solely within the respective mating portion, wherein the pair of complementary interlocking elements includes a projection disposed on and extending from one of the first and second end surface mating portions and a groove formed in an other of the first and second surface mating portions, wherein the projection and the groove have a complementary configuration for secure engagement, and wherein the projection includes an enlarged end having a width dimension that is greater than a width dimension of an opening of the groove.

13. A roller chain comprising: a plurality of links, each link including a pair of side bars and a pair of rollers, wherein one of the rollers is a repair roller including a plurality of symmetrical components configured to cooperatively define a cylinder, each component including a wall having an outer bearing surface, an inner mounting surface, a first end surface and a second end surface, each of the first and second end surfaces including a centrally disposed mating portion and opposed outer portions that extend from respective ends of the mating portion, and one of a pair of complementary interlocking elements disposed solely within the respective mating portion, wherein the pair of complementary interlocking elements includes a projection disposed on and extending from one of the first and second end surface mating portions and a groove formed in an other of the first and second end surface mating portions, wherein the projection and the groove have a complementary configuration for secure engagement, and wherein the groove includes an opening defined in the other of the first and second end surface mating portions, a passage extending from the opening and an enlarged cavity extending from the passage.

* * * * *